United States Patent Office 3,113,961
Patented Dec. 10, 1963

3,113,961
7-CARBO-LOWER-ALKOXY-3-METHYL-2,4,6-OCTATRIEN-1-YLIDENE-TRIPHENYL-PHOSPHORANE
Waldemar Guex, Bottmingen, Otto Isler, Basel, Rudolf Rüegg, Bottmingen, and Gottlieb Ryser, Basel, Switzerland, assignors to Hoffmann-La Roche Inc., Nutley, N.J., a corporation of New Jersey
No Drawing. Original application Nov. 24, 1958, Ser. No. 775,694, now Patent No. 3,014,052. Divided and this application Nov. 3, 1961, Ser. No. 149,843
Claims priority, application Switzerland Nov. 27, 1957
2 Claims. (Cl. 260—469)

This invention relates to polyenecarboxylic acids and esters and to a method for synthesizing such compounds. More particularly, the polyenecarboxylic acids and esters of this invention are novel acids and esters having a carotenoid structure.

The novel polyenecarboxylic acids and esters of this invention fall into two subgroups. One subgroup contains a conjugated system of carbon to carbon multiple bonds, all of which are double bonds. These compounds may be represented by the structural formula

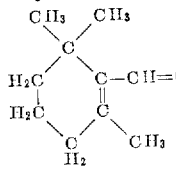
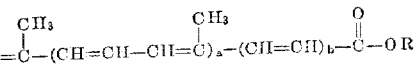
(I)

wherein:
R represents hydrogen or alkyl,
$a$ represents an integer from 0 to 2 and
$b$ represents an integer from 0 to 1, the sum of $a$ and $b$ being 1 or 2.

The second subgroup contains a conjugated system of carbon to carbon multiple bonds, all of which are double bonds except one which is a triple bond. These compounds may be represented by the structural formula

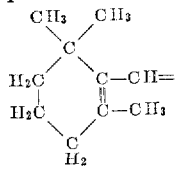
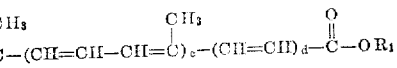
(II)

wherein:
$R_1$ represents hydrogen or alkyl,
$c$ represents an integer from 0 to 3 and
$d$ represents an integer from 0 to 1, the sum of $c$ and $d$ being 1 to 3.

A method of synthesizing compounds of the type illustrated above is also a feature of this invention. In its broad aspects, this method comprises condensing an aldehyde having the Formula III or IV below

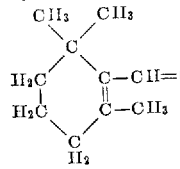
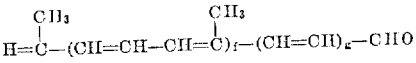
(III)

wherein:
$f$ represents an integer from 0 to 3 and
$g$ represents an integer from 0 to 1,

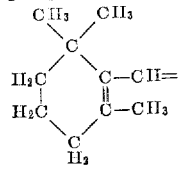
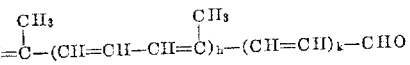
(IV)

wherein:
$h$ represents an integer from 0 to 3 and
$k$ represents an integer from 0 to 1, with a triarylphosphorane selected from the group consisting of carbalkoxymethylene - triaryl - phosphorane, α-carbalkoxyethylidene - triaryl - phosphorane, 3-carbalkoxy-2-buten-1-ylidene-triaryl-phosphorane, 5-carbalkoxy-3-methyl - 2,4 - pentadiene-1-ylidene-triaryl-phosphorane, 5-carbalkoxy-1-methyl-2,4-hexadien - 1 - ylidene - triaryl-phosphorane and 7-carbalkoxy-3-methyl-2,4,6-octatrien-1-ylidene-triaryl-phosphorane, and decomposing, e.g. by heating, the adduct formed as a product of the condensation reaction. The ester thus formed may be converted to the acid by saponification.

The phosphoranes are derived from the corresponding triaryl-phosphonium halides by splitting out hydrogen halide. Thus the phosphoranes enumerated above are derived from carbalkoxymethyl-triaryl-phosphonium halide, α - carbalkoxyethyl - triaryl - phosphonium halide, 3 - carbalkoxy - 2 - buten-1-yl-triaryl-phosphonium halide, 5 - carbalkoxy - 3 -methyl - 2,4 - pentadien - 1 - yl - triaryl-phosphonium halide, 5-carbalkoxy - 1 - methyl-2,4-hexadien-1-yl-triaryl-phosphonium halide and 7-carbalkoxy-3-methyl-2,4,6-octatrien-1-yl-triaryl-phosphonium halide, respectively.

It is generally advantageous to form the phosphorane in situ and to add the aldehyde directly to the reaction mixture in which the desired phosphorane was produced. Consequently, a preferred method of operating the process of this invention comprises treating a triaryl-phosphonium halide so as to remove halogen halide, as described below in greater detail, and reacting an aldehyde of the class described with the product.

The alkyl groups represented by R and $R_1$ in Formulae I and II above, respectively, are straight chain and branched chain aliphatic hydrocarbon groups such as methyl, ethyl, propyl, isopropyl, butyl, isobutyl, amyl, hexyl, cetyl, lauryl, octadecyl and the like, preferably up to about 18 carbon atoms. Lower alkyl groups such as methyl, ethyl, propyl, isopropyl, butyl, isobutyl, amyl, etc. are most preferred. The aryl groups in the triaryl-phosphoranes listed above include such radicals as phenyl, lower alkylphenyl, wherein the lower alkyl group is, for example, methyl, ethyl, propyl, isopropyl and the like, and lower alkoxyphenyl, wherein the lower alkoxy group is, for example, methoxy, ethoxy, propoxy, isopropoxy and the like. Phenyl is the preferred aryl group. The term "carbalkoxy" in the triaryl-phosphoranes refers to the radical

wherein $R_2$ has the same significance as R and $R_1$ (excepting hydrogen) as illustrated above. The halides are chloride, bromide, iodide and fluoride.

According to a particularly preferred embodiment of the invention, a triaryl-phosphonium halide represented by the formula

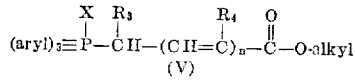

wherein:

X represents a halogen atom, $n$ represents an integer from 0 to 3, $R_3$ represents hydrogen and, if $n$ represents 0, $R_3$ represents hydrogen or methyl, and $R_4$ represents alternately, beginning with methyl, methyl or hydrogen, is converted to the corresponding phosphorane, the latter is condensed with an aldehyde having the Formula VI or VII below

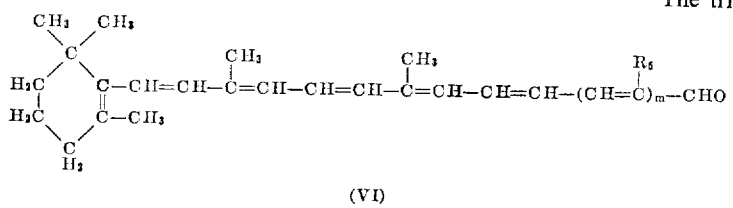

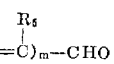

(VI)

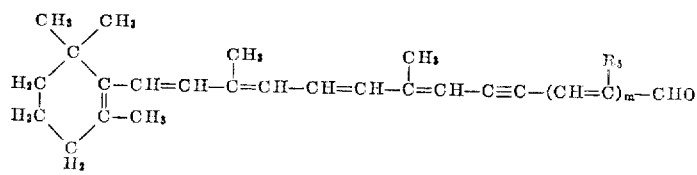

(VII)

wherein, in each of Formula VI and VII, $R_5$ represents alternately, beginning with methyl, methyl or hydrogen and $m$, if $R_3$ in Formula V represents methyl, represents 2,4 or 6, and if $R_3$ in Formula V represents hydrogen, $m$ represents 1, 3 or 5, the sum of $n$ and $m$ not exceeding 6, and the adduct formed is split up, preferably by warming. The ester thus obtained may be converted to the corresponding acid by saponification. If the ester obtained contains a triple bond, it may be selectively reduced by catalytic hydrogenation to a double bond and the hydrogenation product isomerized. It will be appreciated that the preferred area of applicants' invention relates to compounds having the carotenoid structure.

The condensation of the triaryl-phosphorane with the aldehyde is advantageously effected in an inert solvent such as ether, petroleum ether, benzene, methylene chloride, dioxane, tetrahydrofuran and the like. Methylene chloride is preferred. Equimolecular proportions of the two reactants or an excess of the phosphorane are used. The reaction takes place upon admixing the reactants at room temperature. Preferably, air is displaced by an inert gas such as nitrogen.

The condensation product of the reaction between the triaryl-phosphorane and the aldehyde gradually decomposes at room temperature into the desired polyene-carboxylic acid ester and the triaryl-phosphine oxide corresponding to the phosphorane. Heating accelerates the decomposition. Preferably decomposition of the adduct is effected by refluxing the reaction mixture for several hours.

The esters obtained as described above may be converted to the corresponding acid by saponification, with a base, e.g., with alkali metal hydroxide. Preferably this is effected by dissolving the ester in an inert organic solvent, ether, for example, and treating it with an alcoholic solution of alkali metal hydroxide, methanolic sodium hydroxide solution, for example, at room temperature in an inert atmosphere, e.g., under nitrogen.

If an aldehyde of Formula IV or Formula VII is used to prepare the ester, the product also contains a triple bond. This triple bond may be selectively hydrogenated to a double bond, if desired, by suspending the ester in an inert organic solvent such as ethyl acetate, toluene, petroleum ether, etc. and hydrogenating under normal conditions in the presence of a selective hydrogenation catalyst, for example, a lead-palladium catalyst in the presence of quinoline [Helv. Chim. Acta, 35, 446 (1952)].

Hydrogenation of a compound containing a triple bond generally results in a polyene compound having the cis-configuration about the carbon atoms formerly joined by the triple bond. This cis-compound may be converted to the corresponding all-trans compound by isomerization, for example, by heating at a temperature up to about reflux temperature. The cis-compounds and all-trans compounds are all within the scope of this invention.

The triaryl-phosphonium halides may be produced by condensing the appropriate halogenated ester, e.g., α-haloacetic acid alkyl ester, α-halopropionic acid alkyl ester, γ-halotiglic acid alkyl ester, with a triaryl-phosphine, e.g. triphenyl-phosphine, in an inert solvent such as benzene.

The conversion of the triaryl-phosphonium halide to the triaryl-phosphorane by splitting out hydrogen halide may be effected by treating the former with a metallo organic compound, for example, phenyl lithium or butyl lithium, or with an alkali metal alcoholate, for example, sodium methylate. Preferably the dehydrohalogenation is carried out in an inert organic solvent such as ether, alcohol or especially methylene chloride with the exclusion of oxygen.

Alternatively, the triaryl-phosphonium halide may be treated with aqueous alkali as disclosed in copending application Serial No. 741,990, filed June 16, 1958, by M. Gerecke et al, now Patent No. 2,912,467.

The aldehydes of Formula IV may be produced according to the method described in copending application Serial No. 767,278, filed October 15, 1958, by O. Isler et al. and now abandoned, and application Serial No. 767,272, filed October 15, 1958, by O. Isler et al., now Patent No. 2,970,174. The aldehydes of Formula III may be produced according to the method described in copending application Serial No. 767,271, filed October 15, 1958, by O. Isler et al., and now abandoned, and application Serial No. 767,272, filed October 15, 1958, by O. Isler et al., now Patent No. 2,970,174.

The compounds of this invention are stable yellow, red or violet colored compounds which are useful as coloring agents for foodstuffs. They are also useful as additives to poultry feeds for heightening the color of egg yolk, skin, shank, meat and fatty tissue. The compounds having no triple bond also have vitamin A activity.

This application is a division of our copending U.S. patent application Serial No. 775,694, filed November 24, 1958, now U.S. Patent 3,014,052.

The following examples are illustrative of the invention. All temperatures are stated in degrees centigrade.

*Example 1*

65.6 g. of triphenyl-carbomethoxymethyl-phosphonium bromide in 300 ml. of dry methylene chloride were treated with 75 ml. of 2 N sodium methylate, in methanol solution in a nitrogen atmosphere with stirring. After 30 minutes, a solution of 44.6 g. 2,7,11-trimethyl-13-(2,6,6-trimethyl - 1 - cyclohexen - 1 - yl) - 2,6,8,10,12 - tridecapentaen-4-yn-1-al in 300 ml. of methylene chloride were dropped in over a period of 5 minutes. The mixture was refluxed for 5 hours. The mixture was then filtered. The methylene chloride solution was washed with water, dried over sodium sulfate and then filtered through a column containing 200 g. of aluminum oxide (activity state I deactivated with 4% water). The solution was concentrated and then methanol was slowly added until crystallization began. 4,9,13-trimethyl-15-(2,6,6 - trimethyl - 1 - cyclohexen - 1 - yl) - 2,4,8,10,12,14- pentadecahexaen-6-yn-1-carboxylic acid methyl ester was obtained in the form of orange crystals, M.P. 114–116°; absorption maximum at 407 m$\mu$; $E_1^1$=1850 (in petroleum ether).

10 g. of 4,9,13-trimethyl-15-(2,6,6-trimethyl-1-cyclohexen - 1 - yl) - 2,4,8,10,12,14 - pentadecahexaen - 6 - yn-1-carboxylic acid methyl ester were suspended in 100 ml. of petroleum ether (boiling range 80–105°) with 1 g. of lead poisoned palladium-calcium carbonate catalyst and 0.3 ml. of quinoline and agitated in a hydrogen atmosphere at 20° until 900 ml. of hydrogen were absorbed. The catalyst was filtered off and the filtrate was concentrated under high vacuum. The residue was agitated with 50 ml. of petroleum ether (boiling range 40–45°). The product, 6,7-mono-cis-4,9,13-trimethyl-15-(2,6,6 - trimethyl - 1 - cyclohexen - 1 - yl) - 2,4,6,8,10, 12,14-pentadecaheptaen-1-carboxylic acid methyl ester, was obtained by filtration as a fine crystalline powder, M.P. 103–105°; absorption maxima at 305 and 424 m$\mu$; $E_1^1$=790 and 1710 (in petroleum ether).

7.5 g. of the cis-compound obtained above in 40 ml. of petroleum ether (boiling range 80–105°) were refluxed for 8 hours in a carbon dioxide atmosphere and then cooled to 0° and the solvent was filtered off. The product, all trans-4,9,13-trimethyl-15-(2,6,6-trimethyl-1-cyclohexen - 1 - yl) - 2,4,6,8,10,12,14 - pentadecaheptaen-1-carboxylic acid methyl ester, was obtained in the form of orange-red crystals, M.P. 129–130°; absorption maximum at 426 m$\mu$; $E_1^1$=2355 with a shoulder at 445 m$\mu$ (in petroleum ether).

1 g. of the ester obtained above was saponified by stirring with 200 ml. of a 10% methanolic potassium hydroxyde solution and 200 ml. of ether in a nitrogen atmosphere at 20° for 2 days. The mixture was then diluted with water and extracted with ether. The aqueous solution was acidified with dilute hydrochloric acid and the product was filtered off. The all-trans-4,9,13-trimethyl - 15 - (2,6,6 - trimethyl - 1 - cyclohexen - 1- yl) - 2,4,6,8,10,12,14 - pentadecaheptaen - 1 - carboxylic acid was recrystallized from benzene, M.P. 186–187°; U.V. absorption maximum at 430 m$\mu$; $E_1^1$=2235 (in petroleum ether).

*Example 2*

Dilute sodium hydroxide solution was dropped into 70 g. of triphenyl-carbomethoxymethyl-phosphonium bromide in 1500 ml. of cold water with stirring until alkaline to phenolphthalein. The precipitate was filtered off, dried and recrystallized from ethyl acetate-petroleum ether. The colorless prisms of carbomethoxymethylene-triphenylphosphorane melted at 162–163°.

A solution of 44.6 g. 2,7,11-trimethyl-13-(2,6,6-trimethyl - 1 - cyclohexen - 1 - yl) - 2,6,8,10,12 - tridecapentaen-4-yn-1-al in 300 ml. of ethylene chloride were added over a period of 5 minutes with stirring to 53 g. of carbomethoxymethylene-triphenylphosphorane in 300 ml. of dry methylene chloride in a nitrogen atmosphere. The mixture was worked up as described in Example 1 to obtain 4,9,13-trimethyl-15-(2,6,6-trimethyl-1-cyclohexen - 1 - yl) - 2,4,8,10,12,14 - pentadecahexaen-6-yn-1-carboxylic acid methyl ester in the form of orange-red crystals, M.P. 114–1160.

*Example 3*

52 ml. of 2 N sodium methylate in methanol solution were added to 54 g. of triphenyl-($\alpha$-carbomethoxyethyl)-phosphonium bromide in 300 ml. of dry methylene chloride in a nitrogen atmophere with stirring. After 30 minutes, 19.6 g. of 4,9,13-trimethyl-15-(2,6,6-trimethyl-1 - cyclohexen - 1 - yl) - 2,4,8,10,12,14 - pentadecahexaen-6-yn-1-al in 200 ml. of methylene chloride were added over a period of 5 minutes and the mixture was then refluxed for 6 hours. The mixture was filtered and the methylene chloride solution was worked up as described in Example 1. The product, 2,6,11,15-tetramethyl-17-(2,6,6 - trimethyl - 1 - cyclohexen - 1 - yl) - 2,4,6,10,12, 14,16-heptadecaheptaen-8-yn-1-carboxylic acid methyl ester, was obtained in the form of orange-red crystals, M.P . 115–117°; absorption maximum at 423 m$\mu$; $E_1^1$=1950, with a shoulder at 445 m$\mu$ (in petroleum ether).

10 g. of 2,6,11,15-tetramethyl-17-(2,6,6-trimethyl-1-cyclohexen - 1 - yl) - 2,4,6,10,12,14,16 - heptadecaheptaen-8-yn-1-carboxylic acid methyl ester were suspended in 150 ml. of petroleum ether (boiling range 80–105°) with 1.5 g. of lead poisoned palladium-calcium carbonate catalyst and 0.2 ml. of quinoline and agitated in a hydrogen atmosphere at 20° until about 650 ml. of hydrogen were absorbed. The hydrogenation product partially crystallized out. The product was separated by filtering off the catalyst and dissolving in methylene chloride. The methylene chloride solution was evaporated at room temperature under water vacuum. The residue was dissolved in methylene chloride and petroleum ether was added at 20°. The product, 8,9-mono-cis-2,6,11,15-tetramethyl - 17 - (2,6,6 - trimethyl - 1 - cyclohexen - 1 - yl) - 2,4,6,8,10,12,14,16 - heptadecaoctaen - 1 - carboxylic acid methyl ester, melted at 131–133°; absorption maxima at 324 and 443 m$\mu$; $E_1^1$=1040 and 1780, with a shoulder at 465 m$\mu$ (in petroleum ether).

7.4 g. of the cis-compound obtained above in 40 ml. of petroleum ether (boiling range 80–105°) were refluxed for 5 hours in a carbon dioxide atmosphere and then cooled to 0°. The product, all-trans-2,6,11,15-tetramethyl - 17 - (2,6,6 - trimethyl - 1 - cyclohexen - 1 - yl) - 2,4,6,8,10,12,14,16 - heptadecaoctaen - 1 - carboxylic acid methyl ester, was filtered off in the form of red crystals, M.P. 136–137°; absorption maxima at 445 and 471 m$\mu$, $E_1^1$=2575 and 2160 (in petroleum ether).

1.1 g. of the ester obtained above was saponified by stirring in 300 ml. of ether with 300 ml. of 10% methanolic potassium hydroxide solution for 2 days at 20° in a nitrogen atmosphere. The mixture was then diluted with water and extracted with ether. The ether solution was filtered and the precipitate was added to water, acidified with dilute hydrochloric acid and filtered. The product, all-trans - 2,6,11,15 - tetramethyl - 17-(2,6,6-trimethyl - 1 - cyclohexen - 1 - yl) - 2,4,6,8,10,12,14,16 - heptadecaoctaen-1-carboxylic acid, was recrystallized from benzene, M.P. 189–190°; absorption maximum at 448 mμ; $E_1^1=2515$, with a shoulder at 472 mμ (in petroleum ether).

Example 4

Dilute sodium hydroxide solution was added dropwise to 60 g. triphenyl-(α-carbomethoxyethyl)-phosphonium bromide in 1500 ml. of cold water with stirring until alkaline to phenolphthalein. The α-carbomethoxyethylidene-triphenylphosphorane was filtered off, dried and recrystallized from ethyl acetate-petroleum ether in the form of colorless needles, M.P. 152–153°.

A solution of 19.6 g. 4,9,13-trimethyl - 15 - (2,6,6-trimethyl - 1 - cyclohexen - 1 - yl) - 2,4,8,10,12,14 - pentadecahexaen-6-yn-1-al in 200 ml. of methylene chloride were added over a period of 5 minutes with stirring in a nitrogen atmosphere to 47 g. of α-carbomethoxy-ethylidene-triphenylphosphorane in 300 ml. of dry methylene chloride. The product, 2,6,11,15-tetramethyl-17-(2,6,6-trimethyl - 1 - cyclohexen - 1 - yl) - 2,4,6,10,12,14,16 - heptadecaheptaen-8-yn-1-carboxylic acid methyl ester was worked up by the procedure described in Example 3 and obtained in the form of orange-red crystals.

Example 5

12.4 g. of triphenylacarbomethoxymethyl-phosphonium bromide in 60 ml. of dry methylene chloride were treated with 14.1 ml. of 2 N sodium methylate in methanol solution according to the procedure in Example 1. 10 g. of 2,6,11,15-tetramethyl-17-(2,6,6-trimethyl-1-cyclohexen - 1 - yl) - 2,4,6,10,12,14,16 - heptadecaheptaen-8-yn-1-al in 60 ml. of methylene chloride were added to the phosphorane obtained as described in Example 1 and the product was worked up according to the procedure in the same example. 4,8,13,17-tetramethyl-19 - (2,6,6 - trimethyl - 1 - cyclohexen - 1 - yl) - 2,4,6,8,12,14,16,18 - nonadecaoctaen - 10-yn-1-carboxylic acid methyl ester was obtained in the form of bronze colored crystals, M.P. 153–154°; absorption maxima at 439 and 464 mμ; $E_1^1=2110$ and 1670 (in petroleum ether).

8 g. of 4,8,13,17 - tetramethyl - 19-(2,6,6-trimethyl-1-cyclohexen - 1 - yl) - 2,4,6,8,12,14,16,18 - nonadecaoctaen-10-yn-1-carboxylic acid methyl ester suspended in 40 ml. of toluene and 100 ml. of petroleum ether (boiling range 80–105°) with 1 g. of lead poisoned palladium-calcium carbonate catalyst and 0.3 ml. of quinoline were agitated in a hydrogen atmosphere at 20° until about 500 ml. of hydrogen were absorbed. The solution was permitted to stand overnight at 0°, then filtered. The product was separated from the catalyst by dissolving in methylene chloride, filtering and evaporating the solvent. The 10,11 - mono - cis - 4,8,13,17 - tetramethyl - 19 - (2,6,6 - trimethyl - 1 - cyclohexen - 1 - yl) - 2,4,6,8,10,12,14,16,18-nonadecanonaen-1-carboxylic acid methyl ester was recrystallized from methylene chloride-petroleum ether, M.P. 138–140°; absorption maxima at 342 and 461 mμ; $E_1^1=1305$ and 1805, with a shoulder at 481 mμ (in petroleum ether).

7 g. of the cis-compound obtained above in 40 ml. of petroleum ether (boiling range 80–105°) were refluxed for 7 hours in a carbon dioxide atmosphere. 70 ml. of petroleum ether (boiling range 40–45°) were added and the mixture was permitted to stand overnight at 0°. The product, all-trans - 4,8,13,17 - tetramethyl - 19-(2,6,6-trimethyl - 1 - cyclohexen - 1 - yl) - 2,4,6,8,10,12,14,16, 18-nonadecanonaen-1-carboxylic acid methyl ester, was obtained after filtration and was recrystallized from petroleum ether (boiling range 80–105°) in the form of red-violet crystals, M.P. 145–147°; absorption maxima at 464 and 491 mμ; $E_1^1=2570$ and 1975 (in petroleum ether).

1.5 g. of the ester obtained above was saponified by stirring in 700 ml. of ether and 350 ml. of a 10% methanolic potassium hydroxide solution for 2 days at 20° in a nitrogen atmosphere. The mixture was diluted with water and extracted with ether. The ether solution was filtered and the filter residue was added to water, acidified with dilute hydrochloric acid and filtered. The all-trans-4,8,13,17-tetramethyl-19-(2,6,6 - trimethyl-1-cyclohexen-1-yl)-2,4,6,8,10,12,14,16,18-nonadecanonaen - 1-carboxylic acid was recrystallized from benzene, M.P. 190–191°; absorption maxima at 458 and 495 mμ; $E_1^1=2495$ and 1990 (in petroleum ether).

Example 6

21.5 g. of triphenyl-(α-carbomethoxyethyl)-phosphonium bromide in 120 ml. of dry methylene chloride was treated first with 21 ml. of 2 N sodium methylate in methanol solution and then with 9.2 g. of 4,8,13,17- tetramethyl-19 - (2,6,6-trimethyl-1-cyclohexen-1-yl)-2,4,6,8,12, 14,16,18-nonadecaoctaen-10-yn-1-al in 80 ml. of methylene chloride according to the procedure described in Example 3. The product was worked up also as described in that example. The product, 2,6,10,15,19-pentamethyl - 21-(2,6,6 - trimethyl - 1 - cyclohexen-1-yl)-2,4,6,8,10,14,16,18,20-heneicosanonaen-12-yn-1-carboxylic acid methyl ester, was obtained in the form of copper colored crystals, M.P. 161–165°; absorption maxima at 450 and 479 mμ; $E_1^1=2320$ and 1820 (in petroleum ether).

9.5 g. of 2,6,10,15,19-pentamethyl-21-(2,6,6-trimethyl-1 - cyclohexen - 1-yl)-2,4,6,8,10,14,16,18,20 - heneicosanonaen-12-yn-1-carboxylic acid methyl ester suspended in 100 ml. of toluene with 1 g. of lead poisoned palladium-calcium carbonate catalyst and 0.3 ml. of quinoline were agitated in a hydrogen atmosphere at 20° until about 500 ml. of hydrogen were absorbed. 200 ml. of petroleum ether (boiling range 40–45°) were added and the mixture was permitted to stand for 24 hours in the refrigerator. The mixture was filtered and the product was separated from the catalyst by dissolving in methylene chloride, filtering and evaporating the solvent. The product, 12,13-mono - cis - 2,6,10,15,19-pentamethyl-21-(2,6,6-trimethyl-1 - cyclohexen-1-yl)-2,4,6,8,10,12,14,16,18,20-heneicosadecaen-1-carboxylic acid methyl ester, was recrystallized by dissolving in methylene chloride and adding petroleum ether in the form of gray-violet crystals, M.P. 133°; absorption maxima at 361, 472 and 500 mμ; $E_1^1=1435$, 1895 and 1430 (in petroleum ether).

7.5 g. of the cis-compound obtained above in 80 ml. of petroleum ether (boiling range 80–105°) were refluxed overnight in a carbon dioxide atmosphere, then permitted to stand for 12 hours at 0°. The solvent was filtered off and the solid product, all-trans-2,6,10,15,19-pentamethyl-21-(2,6,6-trimethyl-1-cyclohexen - 1 - yl)-2,4,6,8, 10,12,14,16,18,20-heneicosadecaen - 1 - carboxylic acid methyl ester recrystallized from petroleum ether (boiling range 80–105°) in the form of violet crystals, M.P. 140–141°; absorption maxima at 476 and 505 mμ; $E_1^1=2630$ and 1790, with a shoulder at 455 mμ (in petroleum ether).

1.5 g. of the ester obtained above was saponified by stirring in 70 ml. of ether and 350 ml. of a 10% methanolic potassium hydroxide solution for 2 days at 20° in a nitrogen atmosphere. The product, all-trans-2,6,10,15,19 - pentamethyl - 21-(2,6,6-trimethyl-1-cyclohexen-1-yl)-2,4,6,8,10,12,14,16,18,20-heneicosadecaen - 1-carboxylic acid, was worked up according to the procedure described in Example 5 and recrystallized from benzene, M.P. 192°–193°; absorption maxima at 479 and 507 mμ; $E_1^1=2500$ and 1990 (in petroleum ether).

Example 7

7.7 g. of triphenylcarbomethoxymethyl-phosphonium bromide in 40 ml. of dry methylene chloride were treated first with 8.8 ml. of 2 N sodium methylate in methanol solution and then with 7.2 g. 2,6,10,15,19-pentamethyl-21-(2,6,6-trimethyl-1-cyclohexen - 1-yl)-2,4,6,8,10,14,16, 18-heneicosanonaen-12-yn-1-al in 100 ml. of methylene chloride by the procedure described in Example 1. The product was worked up also as described in the same example. The product, 4,8,12,17,21-pentamethyl-23-

(2,6,6 - trimethyl-1-cyclohexen-1-yl)-2,4,6,8,10,12,16,18,20,22-tricosadecaen-14-yn-1-carboxylic acid methyl ester, was obtained as copper colored crystals, M.P. 181–182°; absorption maxima at 463 and 492 mμ; $E_1^1$=2470 and 1870 (in petroleum ether).

5.5 g. of the ester obtained above suspended in 150 ml. of toluene with 1 g. of lead poisoned palladium-calcium carbonate catalyst and 0.3 ml. of quinoline were agitated in a hydrogen atmosphere at 20°, then worked up according to the procedure described in Example 5. The product, 14,15-mono-cis-4,8,12,17,21-pentamethyl-23-(2,6,6 - trimethyl-1-cyclohexen-1-yl)-2,4,6,8,10,12,14,16,18,20,22-tricosaundecaen-1-carboxylic acid methyl ester, showed absorption maxima at 380, 487 and 516 mμ; $E_1^1$=1175, 2100 and 1555. Upon recrystallization, the compound partially changed into the all-trans form. In order to complete the isomerization, the product was refluxed in 100 ml. of petroleum ether (boiling range 80–105°) for 6 hours in a carbon dioxide atmosphere, then worked up as described in Example 3. The all-trans-4,8,12,17,21-pentamethyl - 23-(2,6,6-trimethyl-1-cyclohexen-1-yl)-2,4,6,8,10,12,14,16,18,20,22-tricosaundecaen - 1-carboxylic acid methyl ester was obtained as dark violet crystals, M.P. 165–166°; absorption maxima at 488 and 520 mμ; $E_1^1$=2850 and 2240, with a shoulder at 468 mμ (in petroleum ether).

1.1 g. of the ester obtained above was saponified in 700 ml. of ether and 350 ml. of a 10% methanolic potassium hydroxide solution and worked up as described in Example 5. All-trans-4,8,12,17,21-pentamethyl-23-(2,6,6-trimethyl-1-cyclohexen - 1-yl)-2,4,6,8,10,12,14,16,18,20,22-tricosaundecaen-1-carboxylic acid was recrystallized from toluene in the form of a red, fine crystalline powder, M.P. 201–203°; absorption maxima at 492 and 520 mμ; $E_1^1$= 2485 and 1925 (in petroleum ether).

*Example 8*

10.7 g. of triphenyl - (α - carbomethoxyethyl) - phosphonium bromide in 60 ml. of dry methylene chloride were first treated with 10.5 ml. of a 2 N solution of sodium methylate in methanol and then with 5 g. of 4,8,-12,17 - pentamethyl - 23 - (2,6,6 - trimethyl - 1 - cyclohexen - 1 - yl) - 2,4,6,8,10,12,16,18,20,22 - tricosadecaen-14-yn-1-al in 60 ml. of methylene chloride and worked up according to the procedure of Example 3. The product, 2,6,10,14,19,23-hexamethyl-25-(2,6,6-trimethyl-1-cyclohexen - 1 - yl) - 2,4,6,8,10,12,14,18,20,22,24 - pentacosaundecaen-16-yn-1-carboxylic acid methyl ester, was recrystallized from toluene-petroleum ether, M.P. 187–188°; absorption maxima at 473 and 502 mμ; $E_1^1$=2720 and 2120, with a shoulder at 455 mμ (in petroleum ether).

2.8 g. of the ester obtained above were suspended in 100 ml. of toluene with 1.5 g. of lead poisoned palladium-calcium carbonate catalyst and 0.3 ml. of quinoline and agitated in a hydrogen atmosphere at 20° until the absorption of hydrogen ceased. The catalyst was separated by filtration and the toluene was evaporated from the filtrate at room temperature under high vacuum. The crude 16,17 - mono - cis - 2,6,10,14,19,23-hexamethyl - 25 - (2,6,6 - trimethyl - 1 - cyclohexen - 1 - yl)-2,4,6,8,10,12,14,16,18,20,22,24 - pentacosadodecaen - 1-carboxylic acid methyl ester [absorption maxima at 392, 495 and 526 mμ with a shoulder at 474 mμ (in petroleum ether)] thus obtained was boiled overnight in 100 ml. of petroleum ether (boiling range 80–105°) in a carbon dioxide atmosphere, then allowed to stand at 0° for 12 hours and filtered. The product, all-trans-2,6,10,14,-19,23 - hexamethyl - 25 - (2,6,6 - trimethyl - 1 - cyclohexen - 1 - yl) - 2,4,6,8,10,12,14,16,18,20,22,24 - pentacosadodecaen-1-carboxylic acid methyl ester, was recrystallized from toluene-petroleum ether, M.P. 176–177°; absorption maxima at 497 and 529 mμ; $E_1^1$=2950 and 2350, with a shoulder at 475 mμ (in petroleum ether).

1 g. of the ester obtained above was saponified in 700 ml. of ether and 350 ml. of 10% methanolic potassium hydroxide solution and worked up according to the procedure of Example 5. The all-trans-2,6,10,14,19,23-hexamethyl - 25 - (2,6,6 - trimethyl - 1 - cyclohexen - 1 - yl) - 2,4,6,8,10,12,14,16,18,20,22,24 - pentacosadodecaen - 1-carboxylic acid was recrystallized from toluene in the form of a dark violet fine, crystalline powder, M.P. 210–212°; absorption maximum at 507 mμ, with a shoulder at 535 mμ (in petroleum ether).

*Example 9*

A solution of 5 g. of 4,8,12,17,21-pentamethyl-23-(2,6,6 - trimethyl - 1 - cyclohexen - 1 - yl) - 2,4,6,8,10,-12,16,18,20,22-tricosadecaen-14-yn-1-al in 100 ml. of methylene chloride was added over a period of 5 minutes with stirring to 9 g. of triphenyl-(α-carbomethoxyethylidene)-phosphorane in 50 ml. of dry methylene chloride. The mixture was worked up as described in Example 8 to obtain 2,6,10,14,19,23-hexamethyl-25-(2,6,6-trimethyl-1 - cyclohexen - 1 - yl) - 2,4,6,8,10,12,14,18,20,22,24-pentacosaundecaen-16-yn-1-carboxylic acid methyl ester in the form of dark violet crystals.

*Example 10*

In a vessel fitted with a calcium chloride tube 131 g. of triphenylphosphine were dissolved in 600 ml. of dry benzene, while stirring. Within 30 minutes 95 g. of γ-bromotiglic acid methyl ester were added dropwise. The temperature rose to 30–35°. A viscous side-product precipitated after a few minutes and the solution was separated by decantation. 3-carbomethoxy-2-buten-1-yl-triphenyl-phosphonium bromide began to crystallize and the solution was stirred overnight at room temperature. Then the product was filtrated by suction, washed consecutively with benzene and with petroleum ether (boiling range 40–60°). The phosphonium bromide was obtained as nearly colorless crystals which were dried in vacuo (10 mm. Hg)

36 g. of 3-carbomethoxy-2-buten-1-yl-triphenylphosphonium bromide in 150 ml. of dry methylene chloride were treated first with 37.5 ml. of a 2 N solution of sodium methylate in methanol, then with 22.3 g. of 2,7,11-trimethyl - 13 - (2,6,6 - trimethyl - 1 - cyclohexen - 1-yl)-2,6,8,10,12-tridecapentaen-4-yn-1-al in 150 ml. of methylene chloride and worked up according to the procedure described in Example 1. The product 2,6,11,15-tetramethyl - 17 - (2,6,6 - trimethyl - 1 - cyclohexen - 1-yl) - 2,4,6,10,12,14,16 - heptadecaheptaen - 8 - yn - 1-carboxylic acid methyl ester, was recrystallized from petroleum ether (boiling range 80–105°) in the form of orange crystals and was identical with the compound obtained in Example 3.

*Example 11*

7.5 g. of lithium were dissolved in 1000 ml. of liquid ammonia and acetylene was bubbled through the solution. Within 30 minutes a solution of 140 g. of β-acetyl-acrylic acid methyl ester in 500 ml. absolute diethyl ether was added dropwise. One half of the ammonia was allowed to evaporate and 70 g. of ammonium chloride were added. Then the solution was diluted with 250 ml. of absolute ether and hydrolysed with 400 ml. of a saturated ammonium chloride solution. The ether layer was dried with sodium sulfate and the solvent was driven off. The sirupy residue was dissolved in 300 ml. of ethyl acetate and hydrogenated in the presence of 2 g. of Lindlar catalyst. There was obtained 1-carbomethoxy-3-methyl-3-hydroxy-1,4-pentadiene of B.P. 70–75°/0.03 mm.; $n_D^{28}$=1.4672. This compound was dissolved in absolute ethanol and treated with phosphorus tribromide to form 5 - carbomethoxy - 3 - methyl - 2,4 - pentadien - 1 - yl-bromide; $n_D^{29}$=1.5385. 19.5 g. of this bromide was dissolved in 120 ml. of benzene. While agitating until complete dissolution 24 g. of triphenyl phosphine were added. The mixture was allowed to stand overnight. Then, the crystals were collected by filtration, washed with benzene and with petroleum ether (boiling range 40–50°) and dried in vacuo at 50°. There was obtained 5-carbomethoxy - 3 - methyl - 2,4 - pentadien - 1 - yl - triphenylphosphonium bromide.

10 g. of 5-carbomethoxy-3-methyl-2,4-pentadien-1-yl-triphenyl-phosphonium bromide in 100 ml. of dry methylene chloride were treated first with 10 ml. of a 2 N solution of sodium methylate in methanol and then with 3 g. of 2,6,11,15-tetramethyl-17-(2,6,6-trimethyl-1-cyclohexen - 1 - yl) - 2,4,6,10,12,14,16 - heptadecaheptaen - 8-yl-1-al in 60 ml. of methylene chloride and worked up according to the procedure of Example 3. The product, 4,8,12,17,21 - pentamethyl - 23 - (2,6,6 - trimethyl - 1-cyclohexen - 1 - yl - 2,4,6,8,10,12,16,18,20,22-tricosadecaen-14-yn-1-carboxylic acid methyl ester, was obtained in the form of copper colored crystals identical with the product obtained in Example 7.

*Example 12*

7.5 g. of lithium were dissolved in 1000 ml. of liquid ammonia and acetylene was bubbled through the solution. Within 30 minutes a solution of 140 g. of β-acetylacrylic acid ethyl ester in 500 ml. absolute diethyl ether was added dropwise. One half of the ammonia was allowed to evaporate and 70 g. of ammonium chloride were added. Then the solution was diluted with 250 ml. of absolute diethyl ether and hydrolysed with 400 ml. of a saturated ammonium chloride solution. The aqueous layer was extracted with diethyl ether, the ether extracts collected, washed with saturated ammonium chloride solution, dried with sodium sulfate, filtrated and then concentrated to dryness. There were obtained 135 g. of 1-carbethoxy-3-methyl-1-pentaen-4-yn-3-ol of $n_D^{23}=1.4710$. 168 g. of the acetylenic carbinol were mixed with 168 ml. of dihydropyrane. 2 ml. of 84% phosphoric acid were added while stirring. The temperature of the solution is kept within 20 and 30° and stored overnight at room temperature. The mixture is extracted with 300 ml. of diethyl ether and the extract washed to neutral reaction with a mixture of sodium chloride and sodium bicarbonate solution, then dried with sodium sulfate, filtrated, concentrated and distilled in a Vigreux-column. There were obtained 200 g. of β-tetrahydropyranyl ether of B.P. 85–90°/0.05 mm. 252 g. of this product were hydrogenated in 500 ml. of petroleum ether (boiling range 40–60°) in the presence of 3 g. of Lindlar catalyst. There were obtained 250 g. of 1-carbethoxy-3-methyl-3-tetrahydropyranyloxy - 1,4 - pentadiene; $n_D^{20}=1.4700$. This product was poured into 2000 ml. of dry diethyl ether and a solution of 38 g. of lithium aluminum hydride in 500 ml. of diethyl ether was added dropwise at a temperature of —20 to —10°. 500 ml. of water were added the mixture dissolved in 1000 ml. of 18% aqueous acetic acid. The aqueous layer was extracted with 250 ml. of ether, the ether extract washed neutral with sodium bicarbonate solution, dried with sodium sulfate and the solvent evaporated. There were obtained 210 g. of 4 - methyl - 4 - tetra - hydropyranyloxy - 2,5 - hexadien-1-ol; $n_D^{22}=1.4820$; B.P. 85–90°/0.05 mm. 1000 g. of manganese dioxide were suspended in 400 ml. of low boiling petroleum ether, 212 g. of the hexadienol were added and the mixture was allowed to react at room temperature for 4 hours. After filtration, drying with sodium sulfate and evaporating off the solvent there were obtained 180 g. of 4-methyl-4-tetrahydropyranyloxy-2,5-hexadien-1-al; $n_D^{25}=1.4820$; absorption maximum at 220 mμ; $E_1^1=670$ (in ethanol). 100 g. of the hexadienal, 500 ml. of absolute benzene and 170 g. of (α-carbomethoxy-ethylidene)-triphenyl-phosphorane were heated for 5 hours with reflux. The solvent was eliminated in vacuo and the residue dissolved in 500 ml. of methanol. Then, there were added 125 ml. of water and 1000 ml. of petroleum ether (boiling range 40–50°) and the mixture was agitated. The aqueous methanolic layer was separated, the ether layer was washed consecutively with methanol and with water, dried with sodium sulfate and petroleum ether evaporated. The product was a yellowish oil ($n_D^{23}=1.5170$), which was stirred in 430 ml. of ethanol. The temperature was kept under 5° and 250 ml. of 62% hydrobromic acid were added. After stirring for two hours at 0–5°, the mixture was poured on 1000 ml. of ice water. The product was extracted with 500 ml. of petroleum ether, the extract washed with water to neutral reaction, dried with calcium chloride and the solvent evaporated in vacuo at 20–25°. The product obtained (135 g.) was 3-methyl-7-carbomethoxy-2,4,6-octatrien-1-yl bromide; $n_D^{24}=1.5430$; absorption maximum at 300 mμ; $E_1^1=950$ (in petroleum ether). This product was dissolved in 600 ml. of benzene. 120 g. of triphenyl phosphine were added and the mixture was agitated until dissolution was complete. On storing overnight the product crystallizes. The crystals are collected by filtration under suction, washed with benzene and then with petroleum ether (boiling range 40–50°). After drying in vacuo at 50° there were obtained 138 g. of 7-carbomethoxy - 3 - methyl - 2,4,6 - octatrien - 1 - yl - triphenylphosphonium bromide.

10 g. of 7-carbomethoxy-3-methyl-2,4,6-octatrien-1-yl-triphenyl-phosphonium bromide in 100 ml. of dry methylene chloride were treated first with 9 ml. of a 2 N solution of sodium methylate in methanol, then with 4 g. of 2,6,11,15 - tetramethyl - 17 - (2,6,6 - trimethyl - 1 - cyclohexen - 1 - yl) - 2,4,6,10,12,14,16 - heptadecaheptaen - 8-yn-1-al in 50 ml. of methylene chloride and worked up according to the procedure of Example 3. The product, 2,6,10,14,19,23 - hexamethyl - 25 - (2,6,6 - trimethyl - 1-cyclohexen - 1 - yl) - 2,4,6,8,10,12,14,18,20,22,24 - pentacosaundecaen-16-yn-1-carboxylic acid methyl ester, was identical with the compound obtained in Example 8.

*Example 13*

10 g. of 5-carbomethoxy-3-methyl-2,4-pentadien-1-yl-triphenyl-phosphonium bromide in 100 ml. of dry methylene chloride were treated first with 10 ml. of a 2 N solution of sodium methylate in methanol, then with 2 g. of all-trans-2,6,11,15 - tetramethyl - 17 - (2,6,6 - trimethyl - 1 - cyclohexen - 1 - yl) - 2,4,6,8,10,12,14,16 - heptadecaoctaen-1-al in 40 ml. of methylene chloride and worked up according to the procedure of Example 3. The product obtained, all-trans-4,8,12,17,21-pentamethyl-23 - (2,6,6 - trimethyl - 1 - cyclohexen - 1 - yl) - 2,4,6,8, 10,12,14,16,18,20,22 - tricosaundecaen - 1 - carboxylic acid methyl ester, was identical with the product obtained in Example 7.

*Example 14*

4.5 g. of 7-carbomethoxy-3-methyl-2,4,6-octatrien-1-yl-triphenyl-phosphonium bromide in 50 ml. of dry methylene chloride was treated first with 4 ml. of a 2 N solution of sodium methylate in methanol and then with 2 g. of all-trans-2,6,11,15-tetramethyl - 17 - (2,6,6-trimethyl-1-cyclohexen-1-yl)-2,4,6,8,10,12,14,16 - heptadecaoctaen-1-al in 30 ml. of methylene chloride and worked up according to the procedure of Example 3. The product obtained all-trans-2,6,10,14,19,23-hexamethyl-25-(2,6,6 - trimethyl-1-cyclohexen-1-yl)-2,4,6,8,10,12,14,16,18,20,22,24 - pentacosadodecaen-1-carboxylic acid methyl ester, was identical with the product of Example 8.

*Example 15*

7-carbethoxy-3-methyl-2,4,6-octatrien - 1 - yl - triphenylphosphonium bromide was prepared according to the method given at the beginning of Example 12 but using 172 g. of (α - carbethoxyethylidene) - triphenyl - phosphorane instead of 170 g. of (α-carbomethoxyethylidene)-triphenyl-phosphorane.

10 g. of 7-carbethoxy-3-methyl-2,4,6-octatrien-1-yl-triphenyl-phosphonium bromide in 100 ml. of dry methylene chloride were treated first with 9 ml. of a 2 N solution of sodium methylate in methanol, then with 6 g. of 2,7,11-trimethyl-13-(2,6,6-trimethyl-1-cyclohexen - 1 - yl)-2,6,8,10,12-tridecapentaen-4-yn-1-al in 50 ml. of methylene chloride and worked up according to the procedure of Example 3. The product, 2,6,10,15,19-pentamethyl-21-(2,6,6-trimethyl - 1 - cyclohexen-1-yl)-2,4,6,8,10,14,16,18,20-heneicosanonaen - 12 - yn - 1 - carboxylic acid ethyl ester, melted at 165–166°; absorption maxima at 450 and 478 m$\mu$; $E_1^1$=2275 and 1695.

We claim:

1. 7-carbo - lower alkoxy-3-methyl-2,4,6-octatrien-1-ylidenetriphenylphosphorane.

2. 7-carbomethoxy-3-methyl - 2,4,6 - octatrien - 1 - ylidenetriphenylphosphorane.

References Cited in the file of this patent

UNITED STATES PATENTS 1,003,730    Wittig et al. _____ Mar. 7, 1957

OTHER REFERENCES

Wittig et al.: Ber. Deut. Chem., volume 88, 1654–66 (1955).

UNITED STATES PATENT OFFICE
CERTIFICATE OF CORRECTION

Patent No. 3,113,961                        December 10, 1963

Waldemar Guex et al.

It is hereby certified that error appears in the above numbered patent requiring correction and that the said Letters Patent should read as corrected below.

Column 6, line 17, for "-1160" read -- -116° --; line 42, for "0.2 ml." read -- 0.3 ml. --; column 7, line 24, for "triphenylacarbomethoxymethyl-" read -- triphenylcarbomethoxymethyl- --; line 64, for "-nonadecanonaeen-" read -- -nonadecanonaen- --; column 8, line 21, for "-165°" read -- -163° --; line 56, for "70 ml." read -- 700 ml. --; line 57, for "pitassium" read -- potassium --; column 10, line 9, for "m$^u$" read -- m$\mu$ --; line 30, for "aften" read -- after --; column 11, line 12, for "yl-" read -- yn- --; line 15, for "-yl-" read -- -yl)- --; line 62, for "400 ml." read -- 4000 ml. --.

Signed and sealed this 2nd day of June 1964.

(SEAL)
Attest:

ERNEST W. SWIDER                        EDWARD J. BRENNER
Attesting Officer                      Commissioner of Patents